United States Patent [19]

Göerich

[11] Patent Number: 4,681,342

[45] Date of Patent: Jul. 21, 1987

[54] WHEEL SUSPENSION

[75] Inventor: Hans-Jürgen Göerich, Sersheim, Fed. Rep. of Germany

[73] Assignee: Dr. Ing. h.c.F. Porsche Aktiengesellschaft, Fed. Rep. of Germany

[21] Appl. No.: 855,358

[22] Filed: Apr. 24, 1986

[30] Foreign Application Priority Data

Apr. 24, 1985 [DE] Fed. Rep. of Germany ....... 3514788

[51] Int. Cl.⁴ .............................................. B60G 3/18
[52] U.S. Cl. ..................................... 280/690; 280/701
[58] Field of Search ................ 280/690, 691, 701, 771

[56] References Cited

FOREIGN PATENT DOCUMENTS 2416616 10/1975 Fed. Rep. of Germany ...... 280/690
2822058 11/1979 Fed. Rep. of Germany ...... 280/690
  76315  5/1983 Japan ................................... 280/701

Primary Examiner—David M. Mitchell
Assistant Examiner—Ross Weaver
Attorney, Agent, or Firm—Barnes & Thornburg

[57] ABSTRACT

A wheel suspension for a motor vehicle, especially a rear wheel suspension in which a double cross-guide member formed of two upper and two lower guide arms is pivotally connected at a wheel carrier and forms an elastokinematic axis of rotation with an ideal wheel steering pole. The latter is located to the rear of the axis of rotation of the wheel—in relation to the driving direction—and outside of the track and effects an adjustment with forces acting on the wheel. In relation to the driving direction F, a forwardly disposed lower guide arm of the wheel suspension is retained at the wheel carrier in a joint in front of the axis of rotation of the wheel. At its end, this guide arm is arranged to the rear of the axis of rotation of the wheel and is supported in the vehicle transverse direction in a yielding control bearing support. The latter is located preferably within a coupling quadrangle formed by the joints of the two lower guide arms. The control bearing support is retained at the guide arm arranged to the rear of the wheel axis of rotation and is spring-elastically, transversely adjustably connected with the further guide arm under interposition of the control bearing support.

11 Claims, 6 Drawing Figures

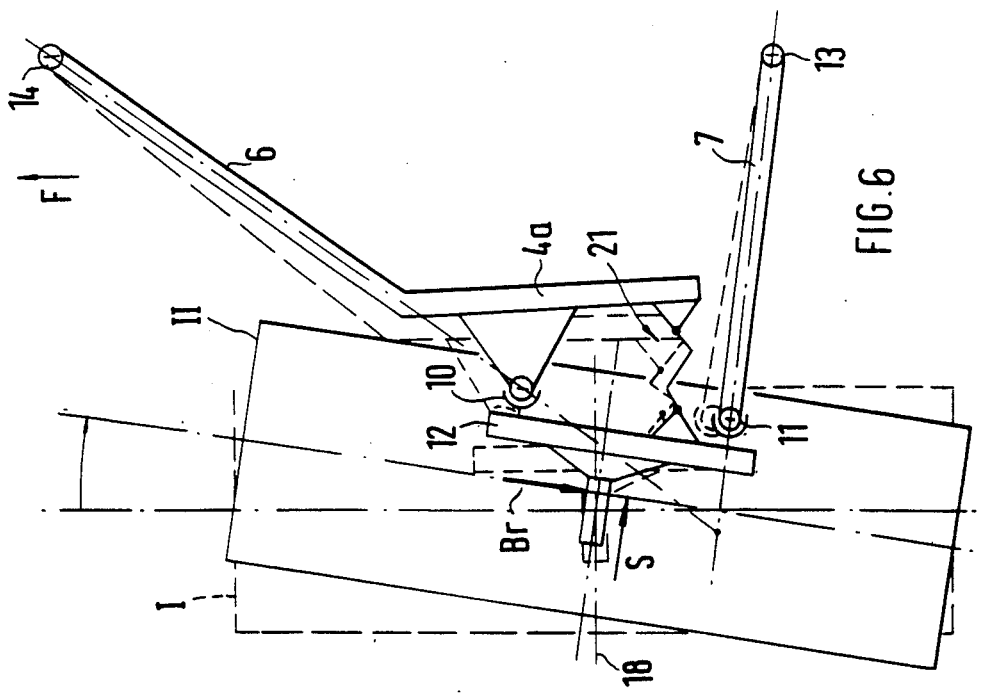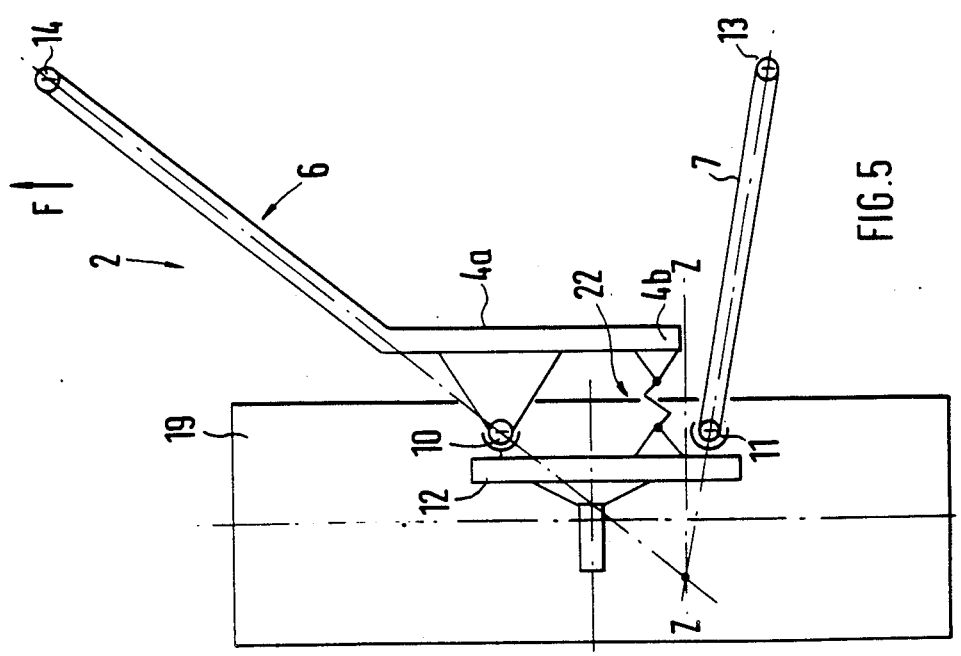

WHEEL SUSPENSION

The present invention relates to a wheel suspension for a motor vehicle, especially to a rear wheel suspension in which a double guide member structure consisting of two upper and two lower guide arms is pivotally connected at a wheel carrier and forms an elastokinematic axis of rotation with an ideal wheel steering axis.

In wheel suspensions for motor vehicles, it is known from the DE-PS 22 00 351 to pivotally connect the lower guide member at the wheel carrier under interposition of elastic elements on both sides of the axis of rotation of the wheel. An ideal wheel steering pole is formed thereby between the bearings which—in relation to the driving direction—is located to the rear of the axis of rotation of the wheel and outside of the track, whereby a wheel position change is achieved during the influence of circumferential or lateral forces on the wheel. With the use of a brake disk arranged in the wheel disk, this arrangement of the ideal wheel steering axis can be realized only with relatively large structural expenditures.

Further, a wheel suspension is disclosed in the DE-OS 23 55 954 in which a spring elastic element is provided in front of the axis of rotation of the wheel—as viewed in the driving direction—between the wheel carrier and wheel guide element. To the rear of the axis of rotation of the wheel, the guide member can be rotated only in the direction of toe-in about a bearing support at the wheel carrier under the influence of lateral forces. A guidance of the wheel carrier connected with the guide members in such a manner that a toe-in change which acts in a stabilizing manner as regards driving behavior, is achieved both in case of lateral forces as also in case of braking forces, cannot be realized with this prior art wheel suspension.

Starting therefrom, the object of the present invention resides in so constructing a wheel suspension that intended wheel position changes are achieved with lateral forces as also with brake forces as well as with starting forces, which assist the driving stability of the motor vehicle during these load conditions.

The underlying problems are solved according to the present invention in that a forwardly disposed lower guide arm of the wheel suspension—as viewed in the driving direction—is retained at the wheel carrier in front of the axis of rotation of the wheel within a joint and is supported at the end thereof in a control bearing support arranged to the rear of the wheel axis of rotation and yielding in a vehicle transverse direction.

The wheel suspensions according to the present invention offer the possibility to so guide the wheel under the effect of brake, lateral and starting forces that a defined wheel position change takes place. This becomes possible by the control bearing support which includes a spring elastic element that has a corresponding characteristic in the vehicle transverse direction. However, it would also be feasible within the scope of the present invention to provide a corresponding control of the guide member as a function of the occurring forces and thus also of the wheel for purposes of positional adjustment.

The control bearing support is so constructed that a pivoting of the wheel in the direction of toe-in is made possible during the braking and a pivoting of the wheel in the direction of toe-out is made impossible during the starting and acceleration while a pivoting of the wheel in the direction of toe-in is also made possible in case of a lateral force. With the use of the control bearing in a double cross-guide member axle, a displacement of the ideal wheel steering pole in the road plane results during the spring inward (compression) and spring outward (rebound) movement, and more particularly toward the outside and rear during the spring inward movement and toward the inside during the spring outward movement. The effective moment for the wheel displacement and therewith the magnitude of the adjustment is correspondingly changed thereby.

By the adaptable inclination of the two lower guide members to one another in such a manner that an ideal wheel steering pole outside of the track and to the rear of the wheel axis of rotation results, the possibility is created in contrast to the DE-PS 22 00 351 that a brake installation can still be provided in the wheel disk. A more tight and stiff guidance of the wheel is also made possible during the drive by the inventive control bearing.

These and other objects, features and advantages of the present invention will become more apparent from the following description when taken in connection with the accompanying drawing which shows, for purposes of illustration only, two embodiments in accordance with the present invention, and wherein:

FIG. 5 is a plan view on a further embodiment of a wheel guide system in accordance with the present invention with a control bearing arranged between the wheel carrier and a forward guide arm; and FIG. 6 is a plan view of the lower wheel guide member with a wheel displaced under the influence of brake or lateral forces, illustrated in full lines.

Figure 1:
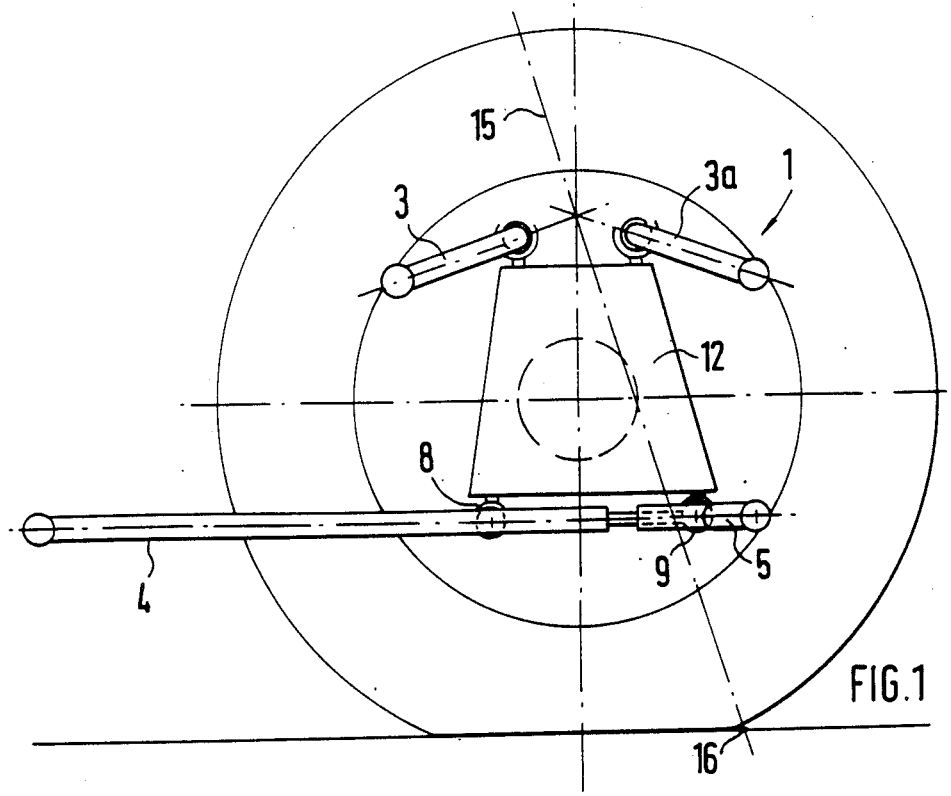
FIG. 1 is a schematic side elevational view of a wheel guide system with a control bearing and elastokinematic axis of rotation.
Figure 2:
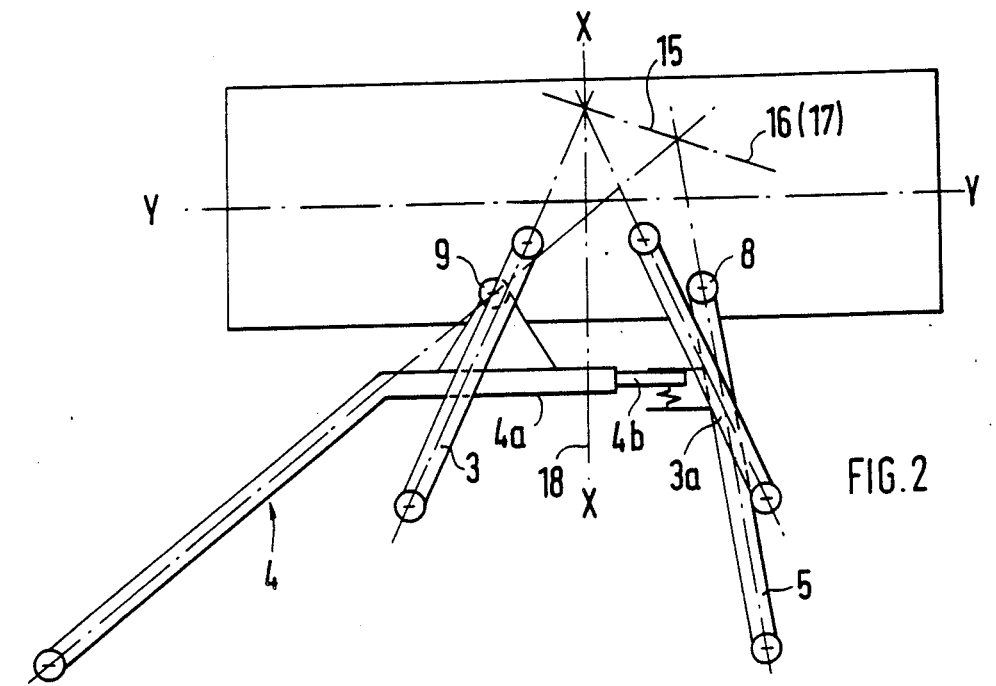
FIG. 2 is a plan view on FIG. 1.

Referring now to the drawing wherein like reference numerals are used throughout the various views to designate like parts, the wheel suspension generally designated by reference numeral 1 (FIG. 1) and reference numeral 2 (FIG. 5) includes upper guide arms 3, 3a and lower guide arms 4, 5; 6, 7 which are pivotally connected, on the one hand, at the wheel carrier 12 by way of joints 8, 9; 10, 11 and, on the other, at the body by way of further joints 13, 14. The guide arms of a guide member extend respectively to both sides of a vertical wheel center cross plane X—X. They are inclined to one another in such a manner that an elastokinematic axis of rotation 15 results which forms an ideal wheel steering pole 16, 17 in the plane of the road surface. This pole 16, 17 which is the point of intersection of the ideal axis of rotation 15 of the wheel suspension with the point of contact of the wheel on the road, is so arranged that it assumes a position—in relation to the driving direction F—to the rear of the wheel axis of rotation 18 and outside of the track, respectively, the vertical longitudinal center plane Y—Y extending through the wheel 19. The wheel steering pole 17 of FIGS. 5 and 6 is illustrated in FIGS. 1 and 2.

According to FIGS. 1 to 4, a forwardly disposed guide arm 4 of the wheel suspension—in relation to the driving direction F—is supported in the joint 9 in front of the axis of rotation 18 of the wheel. An arm portion 4a which extends beyond this joint 9 to the further guide arm 5 is supported with its free end 4b in a control bearing support 20. The control bearing support 20 has a corresponding characteristic in the vehicle transverse direction 21 (FIG. 3) which enables a wheel adjustment in the direction of toe-in under the influence of brake forces Br and lateral forces S (FIG. 4) but no toe-out under the influence of starting forces A. The control bearing support 20 is preferably arranged to the rear of the axis of rotation 18 of the wheel—in relation to the driving direction F—and within a coupling quadrangle formed by the joints 8, 9, 13 and 14.

Figure 4:
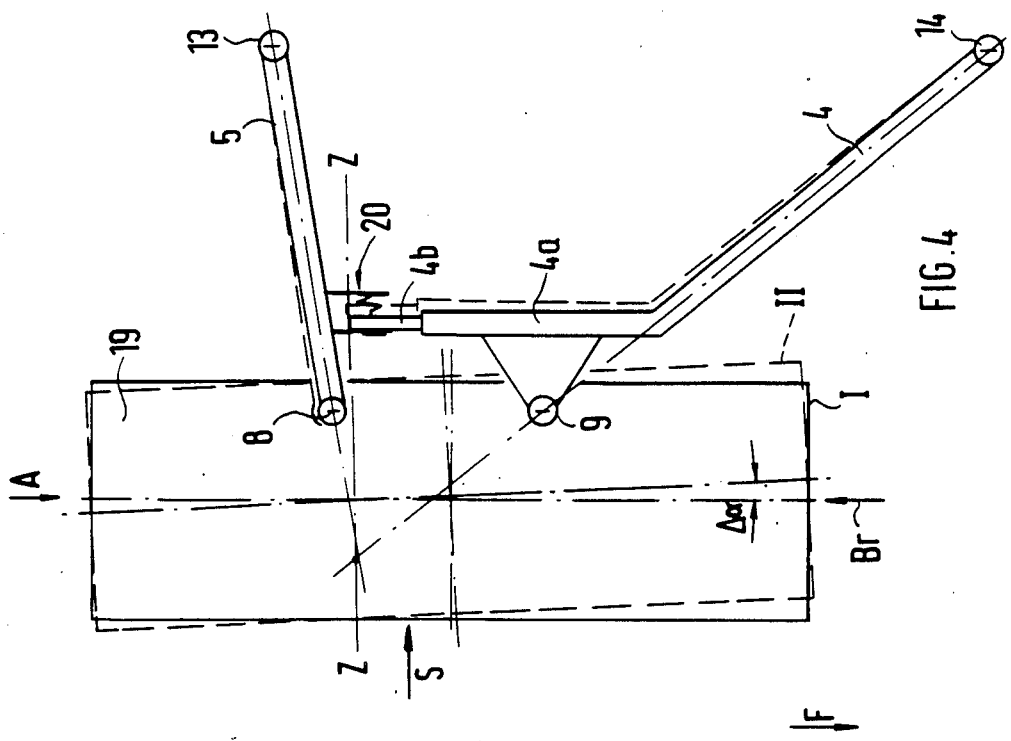
FIG. 4 is a plan view of the wheel displaced under the effect of braking or lateral forces, illustrated in dash lines.
Figure 3:
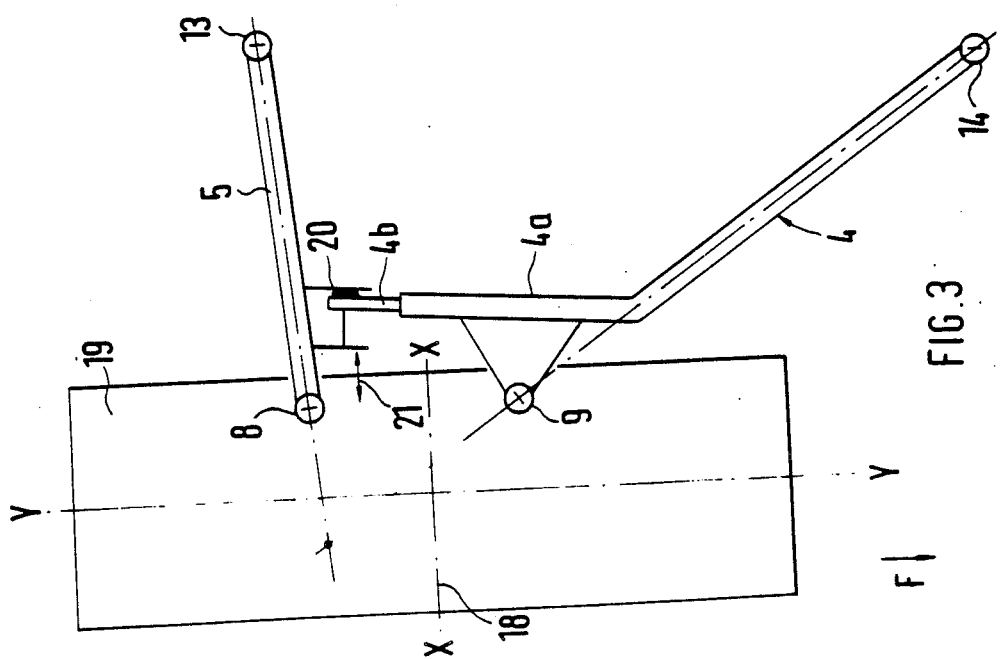
FIG. 3 is a plan view on the two inclined guide arms of the lower wheel guide member in the wheel suspension according to the present invention.

As FIG. 4 shows more clearly, an adjustment of the wheel 19 from the position I into the position II is achieved by the brake forces Br and the lateral forces S, whereby in the position II, the wheel 19 assumes a toe-in position with the angle α. The turning-in (toe-in) of the wheel 19 is determined by the construction of the control bearing support 20 in its characteristics.

According to a further embodiment of the present invention illustrated in FIGS. 5 and 6, the control bearing support generally designated by reference numeral 22 is provided in the wheel suspension 2 between the wheel carrier 12 and the guide arm 6. It is connected with the free end 4b of the guide arm part 4a so that a pivot movement of the guide arm 6 about the joint 10 on the wheel carrier side becomes possible. By reference to FIG. 6 it can be seen that the wheel 19 will adjust itself under the influence of brake forces Br and lateral forces S from the position I also into the position II in the direction of toe-in. This control bearing support 22 also is located to the rear of the axis of rotation 18 of the wheel—in relation to the driving direction F—and between the further guide member 7 and within the coupling quadrangle formed by the joints 10, 11, 13 and 14.

While I have shown and described only two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A wheel suspension for a motor vehicle, comprising a double cross-guide member structure including two upper and two lower guide arms, said double cross-guide member structure being pivotally connected at a wheel carrier and forming an elastokinematic axis of rotation with an ideal wheel steering pole which—in relation to the driving direction—is located to the rear of the axis of rotation of the wheel and outside of the track, the wheel being adjustable in case of forces acting on the same, a forwardly disposed lower guide arm of the wheel suspension—in relation to the driving direction—being retained at the wheel carrier in front of the axis of rotation of the wheel within a joint means and being supported at its rearward end on a control bearing support means arranged to the rear of the wheel axis of rotation and yielding in the vehicle transverse direction.

2. A wheel suspension according to claim 1, wherein the control bearing support means is located inside of a coupling quadrangle formed by the joint means of the two lower guide arms.

3. A wheel suspension according to claim 2, wherein the control bearing support means is retained at the rear end of the forwardly disposed lower guide arm and the latter is spring-elastically, transversely adjustably connected with the further lower guide arm under interposition of the control bearing support means.

4. A wheel suspension according to claim 3, wherein the forwardly disposed guide arm includes a guide arm portion extending substantially in the vehicle longitudinal direction which is retained with its free end in the control bearing support means.

5. A wheel suspension according to claim 1, wherein the control bearing support means has a spring elastic transverse yieldingness between the forwardly disposed lower guide arm of the wheel suspension and the wheel carrier, the free end of said last-mentioned guide arm being supported in said control bearing support means and said guide arm being retained pivotal about a joint means on the wheel carrier side.

6. A wheel suspension according to claim 1, wherein the control bearing support means is arranged between the axis of rotation of the wheel and a cross plane passing through the ideal steering pole of the wheel.

7. A wheel suspension according to claim 1, wherein the joint means of the lower guide arms on the wheel carrier side as well as the elastic bearing support means are located in a common vertical plane.

8. A wheel suspension according to claim 7, wherein the plane—as viewed in the driving direction—extends obliquely to the vehicle longitudinal center axis.

9. A wheel suspension according to claim 1, wherein the control bearing support means is retained at the rear end of the forwardly disposed lower guide arm and the latter is spring-elastically, transversely adjustably connected with the further lower guide arm under interposition of the control bearing support means.

10. A wheel suspension according to claim 9, wherein the forwardly disposed guide arm includes a guide arm portion extending substantially in the vehicle longitudinal direction which is retained with its free end in the control bearing support means.

11. A wheel suspension according to claim 5, wherein the forwardly disposed guide arm includes a guide arm portion extending substantially in the vehicle longitudinal direction which is retained with its free end in the control bearing support means.

* * * * *